(12) United States Patent
Aleksovski

(10) Patent No.: US 9,336,329 B2
(45) Date of Patent: May 10, 2016

(54) PERFORMING A SEARCH FOR A DOCUMENT

(75) Inventor: Zharko Aleksovski, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 185 days.

(21) Appl. No.: 14/117,859

(22) PCT Filed: May 14, 2012

(86) PCT No.: PCT/IB2012/052387
§ 371 (c)(1),
(2), (4) Date: Nov. 15, 2013

(87) PCT Pub. No.: WO2012/156893
PCT Pub. Date: Nov. 22, 2012

(65) Prior Publication Data
US 2014/0101191 A1    Apr. 10, 2014

(30) Foreign Application Priority Data

May 18, 2011  (EP) .................................... 11166541

(51) Int. Cl.
G06F 17/30  (2006.01)
G06F 17/27  (2006.01)

(52) U.S. Cl.
CPC .......... *G06F 17/3097* (2013.01); *G06F 17/276* (2013.01); *G06F 17/3064* (2013.01)

(58) Field of Classification Search
CPC .................................................. G06F 17/3097
See application file for complete search history.

(56) References Cited

U.S. PATENT DOCUMENTS

| | | | |
|---|---|---|---|
| 6,564,213 B1 * | 5/2003 | Ortega et al. | |
| 6,839,702 B1 * | 1/2005 | Patel et al. | |
| 7,814,159 B2 | 10/2010 | Sego et al. | |
| 2005/0283468 A1 * | 12/2005 | Kamvar et al. | 707/3 |
| 2006/0206454 A1 * | 9/2006 | Forstall et al. | 707/3 |
| 2008/0082578 A1 * | 4/2008 | Hogue et al. | 707/104.1 |
| 2008/0109401 A1 * | 5/2008 | Sareen et al. | 707/3 |
| 2012/0047134 A1 * | 2/2012 | Hansson et al. | 707/731 |

FOREIGN PATENT DOCUMENTS

KR      20100037512 A     4/2010

OTHER PUBLICATIONS

Hoeber, O. et al. "BrowseLine: 2D Timeline Visualization of Web Browsing Histories", Proceedings of the International Conference on Information Visualization, 2009, pp. 156-161.
Bast, H. et al: "The complete Search Engine: Interactive, Efficient, and Towards IR&DS Integration", CIDR 2007: 3rd Biennial Conference on Innovative Data Systems Research, Jan. 7, 2007.
Amin, A. et al: "Organizaing Suggestions in Autocompletion Interfaces", Apr. 6, 2009, Advances in Information Retrieval, pp. 521-529.
Plaisant, C. et al. "LifeLines: Using Visualization to Enhance Navigation and Analysis of Patient Records". 1998 AMIA, Inc. p. 76-80.
Plaisant, C. et al. "LifeLines: Visualizing Personal Histories". T.R. 95-88. National Science Foundation Engineering Research Center Program, p. 1-9, 1996.

* cited by examiner

*Primary Examiner* — Richard Bowen

(57) ABSTRACT

A system for performing a search for a document in a collection of documents (11) is presented. A user input unit (1) enables a user to indicate a part of a search term. An auto completion unit (2) determines one or more completions of the part of the search term in order to obtain one or more completed search terms. An associating unit (3) associates a completed search term with a document matching the completed search term, wherein the document has a property, e.g. a time, associated therewith. An arranging unit (4) arranges the one or more completed search terms, based on the property of the documents associated with the completed search terms, to obtain an arrangement. A display unit (5) displays the one or more completed search terms according to the arrangement.

18 Claims, 3 Drawing Sheets

PERFORMING A SEARCH FOR A DOCUMENT

This application is a national stage application under 35 U.S.C. §371 of International Application No. PCT/IB2012/052387 filed on May 14, 2012 and published in the English language on Nov. 22, 2012 as International Publication No. WO/2012/156893, which claims priority to European Application No. 11166541.0 filed on May 18, 2011, the entire disclosures of which are incorporated herein by reference.

FIELD OF THE INVENTION

The invention relates to performing a search for a document.

BACKGROUND OF THE INVENTION

Searching for information is an important functionality of many information systems. In a clinical setting, the search process is usually limited to a particular time period; most often, the more recent documents and events in a patient file are more important than the older ones.

Some search engines, such as Google and Yahoo, provide a feature known as 'autocompletion'. This feature processes the character string a user is typing in the search bar, and suggests potentially relevant search terms that start with these characters. These search terms are typically displayed in a menu below the search bar, to enable the user to easily select one search term of the displayed suggested search terms. When the user has selected such a search term, a new screen is displayed in which the search results for the selected search term are shown. However, the autocompletion suggestions provided by these known search engines can be in any of the documents in the database. Consequently, it is difficult for a user to guess the relevance of a search term suggested by the system.

In the clinical setting, the users frequently need to find documents in a patient file. Consequently, a search engine may be implemented that searches the documents in a particular patient file. Such a search engine may also display a list of suggested completions of a partially entered search term. Also in this setting, it is difficult to guess the relevance of the suggested search terms.

An example of a user interface of a search engine with autocompletion is shown in FIG. 2. The figure shows a search bar 315, known in the art per se, in which the user can enter characters of a search string 214. The system then shows a box 314 containing a list of suggestions to complete the search string 214.

"BrowseLine: 2D Timeline Visualization of Web Browsing Histories", by O. Hoeber and J. Gorner, in: Proceedings of the International Conference on Information Visualisation, 2009, pages 156-161, hereinafter: Hoeber et al., discloses a visual interface for re-finding previously viewed Web pages in browsing histories. BrowseLine employs a two-dimensional timeline metaphor, allowing users to visually identify temporal patterns within their browsing histories. These visual patterns can be matched to the users' recollection of their browsing activities, allowing them to jump to a time interval in their browsing history for further investigation. When a user types a portion of a domain name in the appropriate filter textbox, a visual indication is provided to highlight those domains that match the filter. The matched domain stacks are rendered with a dark border, and all other domain stacks are faded away. The resulting effect is that the matched domains pop out of the display due to the high luminance contrast between foreground and background.

SUMMARY OF THE INVENTION

It would be advantageous to have an improved system for performing a search for a document. To better address this concern, a first aspect of the invention provides a system comprising a user input unit for enabling a user to indicate a part of a search term;

an autocompletion unit for determining one or more completions of the part of the search term, to obtain one or more completed search terms;

an associating unit for associating each completed search term of the one or more completed search terms with a document matching the completed search term, wherein the document has a property associated therewith;

an arranging unit for arranging each completed search term of the one or more completed search terms in a display, based on the property of the document associated with the completed search term, to obtain an arrangement of the one or more completed search terms; and a display unit for displaying the arrangement of the one or more completed search terms.

Such a system helps the user to estimate the relevance of a suggested search term, because the completed search terms are arranged according to the property of the documents. This way, an indication of the property of the document or documents containing the suggested search term is obtained, which may give the user just enough information to select the most relevant search term from among the displayed completed search terms.

The arranging unit may be configured to arrange the one or more completed search terms into groups, wherein each group comprises the completed search terms matching a particular document of the collection of documents. This provides an efficient way to quickly review the completed search terms.

The display unit may be arranged for updating the display of the one or more completed search terms in response to the user input receiving an indication of an additional part of the search term. This way, the user can continue providing additional parts of the search term, until the desired completed search term appears on the timeline.

The property of the documents may comprise a time. The time of the document may comprise, for example, any one of a creation time, modification time, access time, or time of a clinical event that is the subject of the document. The time of the document may comprise a date and/or a time of day. By arranging the completed search terms based on the time of the associated document, an enhanced insight is provided in the relevance of the search terms, because it becomes possible to distinguish search terms occurring in older documents from more search terms occurring in more recent documents.

The arranging unit may be configured to arrange the one or more completed search terms on a timeline based on the time of the document associated with the completed search term. The timeline is a convenient and efficient way to arrange the items based on the time.

The part of the search term may comprise a first string, and a completed search term may comprise a second string, wherein the first string is a substring of the second string. This is a logical property for a completed search term, that may be used by the autocompletion unit to find a completed search term from a collection of search terms.

The display unit may be arranged for displaying a text label representing a completed search term in connection with a symbol representing the associated document. This is a convenient way to display the search term.

The display unit may be arranged for displaying a snippet of text extracted from the associated document, wherein the snippet of text comprises the search term. This provides the user with more context of how the search term is used, and makes it easier to determine the relevance of the search term.

The system may comprise a selection unit for enabling the user to select a completed search term from among the displayed completed search terms, to obtain a selected completed search term. This allows the user to indicate with which search term he wishes to proceed.

The system may comprise a search engine for searching documents matching the selected completed search term. This way, more documents comprising the selected completed search term may be found.

The system may comprise a document viewer for enabling a user to view the document associated with the selected completed search term. This allows the user to open the document for viewing by merely selecting the associated completed search term.

The document viewer may be arranged for indicating the one or more occurrences of the autocompletion term in the viewed document. This allows to quickly see where the search term occurs in the document.

In another aspect, the invention provides a workstation comprising the system set forth.

In still another aspect, the invention provides a method of performing a search for a document, comprising enabling a user to indicate a part of a search term;
determining one or more completions of the part of the search term, to obtain one or more completed search terms.
associating each completed search term of the one or more completed search terms with a document matching the completed search term, wherein the document has a property associated therewith;
arranging each completed search term of the one or more completed search terms in a display, based on the property of the document associated with the completed search term, to obtain an arrangement of the one or more completed search terms; and
displaying the arrangement of the one or more completed search terms.

In another aspect, the invention provides a computer program product comprising instructions for causing a processor system to perform the method set forth.

It will be appreciated by those skilled in the art that two or more of the above-mentioned embodiments, implementations, and/or aspects of the invention may be combined in any way deemed useful.

Modifications and variations of the workstation, the method, and/or the computer program product, which correspond to the described modifications and variations of the system, can be carried out by a person skilled in the art on the basis of the present description.

BRIEF DESCRIPTION OF THE DRAWINGS

These and other aspects of the invention are apparent from and will be elucidated in the description hereinafter, with reference to the drawing.

DETAILED DESCRIPTION OF EMBODIMENTS

In the following description, systems and methods are described in more detail. These systems and methods are examples only. The skilled person will be able to devise modifications and additions to the described systems and methods.

Figure 1:
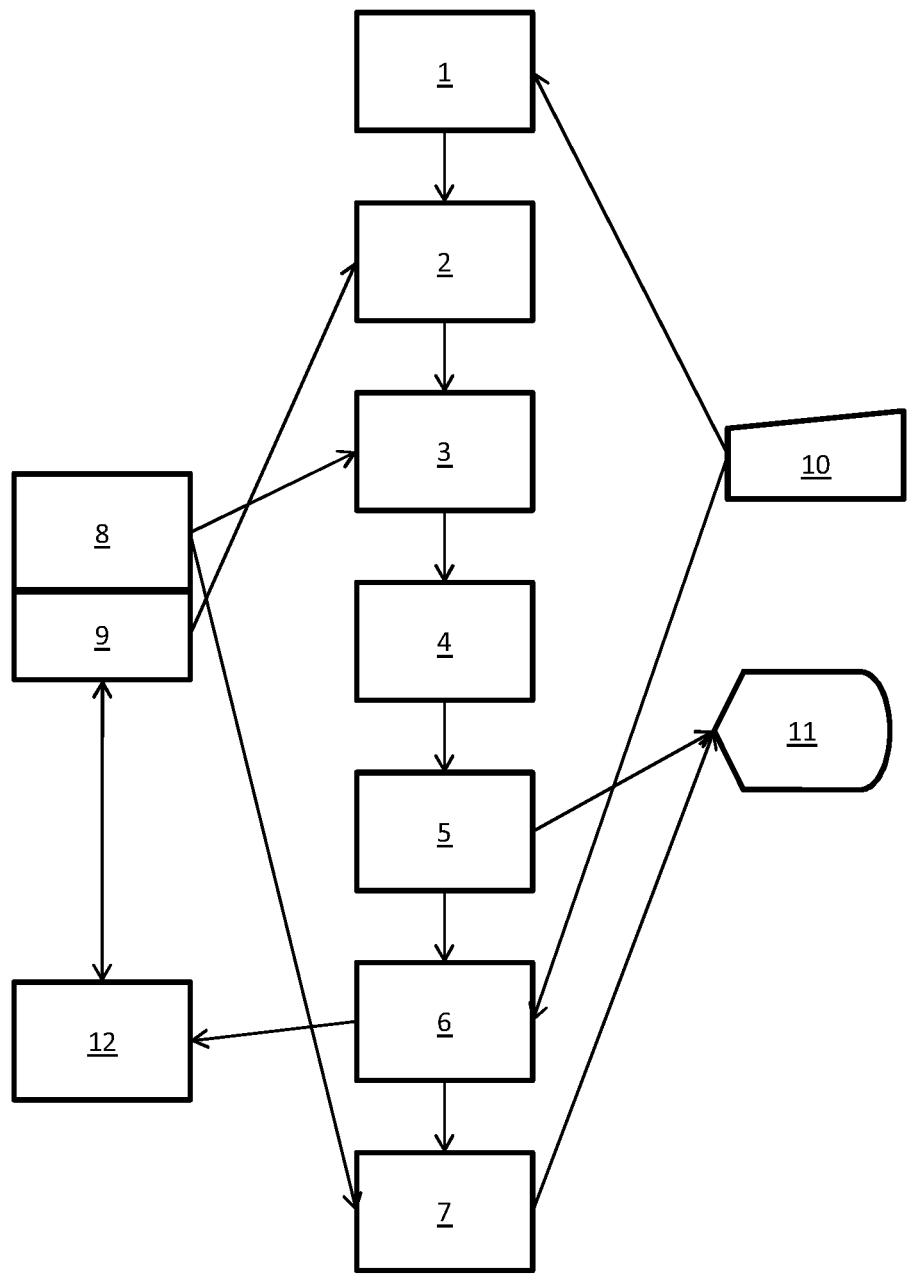
FIG. 1 is a block diagram of a system for performing a search for a document in a collection of documents.
Figure 2:
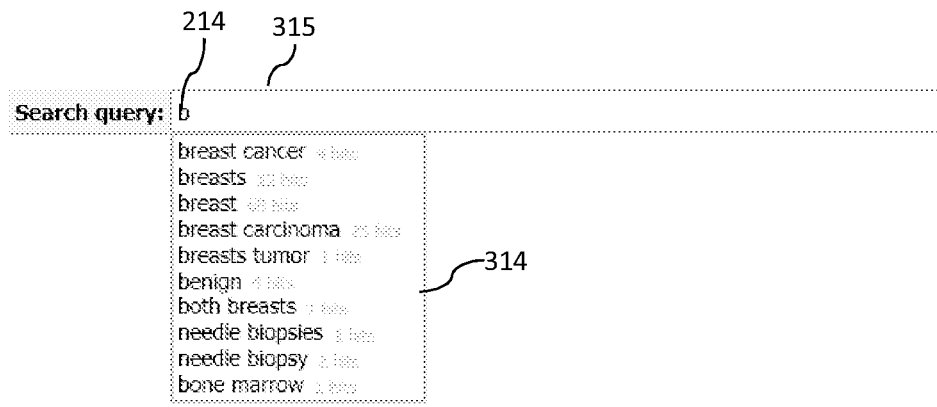
FIG. 2 shows a prior art application of a search bar with autocompletion.

FIG. 1 shows a system for performing a search for a document in a collection of documents. The system may be implemented, for example, using a computer system loaded with a suitably adapted computer program. The computer system may comprise a distributed computer system. For example, the proposed functionality may be provided by the computer system as a web application. The user may access the functionality, using a web browser installed on a workstation or mobile device. Alternatively, the system may be implemented in its entirety on a single computer device. Other arrangements based on distributed or standalone systems are within reach of the skilled person in view of this disclosure.

As shown in FIG. 1, the system may comprise a user input device 10. Such an input device 10 may comprise a keyboard, a mouse, a touch screen. Other input devices can also be used in conjunction with the system. For example, a microphone and speech recognition may be used to input a part of a text string. The system may further comprise a display device 11. This display device 11 may comprise an LCD display, for example. Other kinds of display are also possible. The display device 11 may also comprise a touch screen. In this case, the user input device 10 and the display device 11 may be integrated in a single touch screen device. The system may have access to a collection of documents 8. This collection of documents 8 may be included in a database, for example a patient database such as a hospital information system or a radiology information system. The database may also be cloud-based, for example an online personal health record hosted by a health vault provider. Other kinds of databases are also possible. Moreover, the collection of documents can relate to other kinds of subject matter, such as a collection of web pages. For example, the collection of documents can comprise a set of documents found on the Internet. The collection of documents 8 may also be stored locally within the system described herein, for example on a local file system, or on a remote file system. The documents may have properties. These properties may be stored as metadata linked to the document content. For example, a filename, a date/time, a type of document, and other properties may be associated with the documents. Different kinds of date/time properties may be associated with the documents, for example a creation time, a modification time, an access time, or another kind of time information. Herein, it will be understood that a time property may also include a date.

The system may further have access to an index of search terms 9. Such an index of search terms 9 may be prepared before the system is used. The index of search terms 9 may also be extended based on the search terms provided by the user. The index of search terms 9 may be part of the system, or may communicate with the system via a network connection, for example. For example, the index of search terms 9 is generated by a database system in which the collection of documents 8 is stored.

The system may further comprise a user input unit 1 that is operatively coupled to the user input device 10 to receive characters inputted by the user by means of the input device 10. This way, the user input unit 1 receives at least part of a search term. This at least part of a search term will be referred to hereinafter as 'input string', however, the skilled person will understand that the input that may be processed by the system is not limited to a string. Other formats for specifying at least part of a search term may also be used. For example, the user input unit may receive a complete search term from the user input device 10, and forward the search term to the search engine 12, so that a list of documents matching the search term is generated that can be displayed on the display device 11. However, this functionality is not shown in the drawing.

The system may further comprise an autocompletion unit 2. This unit is arranged for determining one or more completions of the inputted part of the search term. This way one or more completed search terms are found based on the inputted part of the search term. For example, the system may comprise an index of search terms 9. The autocompletion unit 2 may be configured to find search terms matching the input string in this index of search terms 9. Alternatively, the search engine 12 may be arranged for searching a database of documents for terms comprising the input string, and the autocompletion unit 2 may be arranged for using those terms as the completed search terms. For example, the inputted search term may consist of a first string. The completed search term may consist of a second string, wherein the second string is selected from a set of possible search strings, based on the criterion that the first string is a substring of the second string.

The system may further comprise an associating unit 3 arranged for associating a completed search term with a document of the collection of documents 8. The associated document thus obtained is selected from the collection of documents 8 by the associating unit 3 because the document matches the completed search term. The associating unit thus associates a completed search term with one or more of the documents in which that search term appears. Different options are possible for the associating unit 3. For example, the associating unit 3 may associate all matching documents with a search term. Alternatively, the associating unit associates only a selection of one or more matching documents with the search term. For example, a relevance assessment is first made to identify the most relevant matching document or documents. For example, the most recent document or the most recent N documents are associated with the search term, wherein N is a predetermined number. Other relevance assessment algorithms may be used and are in reach of the person skilled in the art in view of this description.

The system may further comprise an arranging unit 4 configured to arrange the one or more completed search terms, based on a property of the documents associated with the completed search terms, to obtain an arrangement. For example, the search terms may be sorted based on the property of the associated documents. When a plurality of documents is associated with a particular completed search term, the arrangement may include a plurality of copies of the completed search term. Alternatively, the arrangement may include only one copy or a subset of the copies. For example, only the copy associated with the most recent document is selected, or one type of document is favored over another kind of document.

The arranging unit may be configured to define a position for each completed search term on a display area, based on the property of the associated document. For example, the arranging unit may be configured to apply a mapping to map values of the property to positions in the display area. The mapping may be used to position the completed search terms on the display area. For example, a line may be drawn in the display area, wherein points on the line represent values of the property. A representation of the completed search term may be displayed near the point corresponding to the property of the associated document. A line, or another indicator, may be drawn, for example, from the written completed search term to the appropriate point on the line to indicate the position of the completed search term on the line.

The system may further comprise a display unit 5 arranged for displaying the one or more completed search terms according to the arrangement. To this end, the display unit 5 may be coupled to the display device 11, for example via a graphics subsystem such as a window system, and a graphics card. The display unit 5 may control a graphics subsystem to generate a rendering of the one or more completed search terms according to the generated arrangement on the display device 11.

The arranging unit 4 may be configured to arrange the one or more completed search terms into groups. Each group may be generated such that it comprises the completed search terms matching a particular document of the collection of documents.

The display unit 5 may be arranged for updating the display of the one or more completed search terms in response to the user input receiving an indication of an additional part of the search term. For example, after each keystroke, causing an additional character to be added to the inputted search term, the display may be updated. Moreover, when one or more characters are deleted from the inputted search term, the display may also be updated. This updating of the display may comprise updating the set of completions of the inputted part of the search term by the autocompletion unit 2. The updating of this set of completions may include adding completed search terms and/or removing completed search terms that no longer match the inputted search term. The updating of the display may further comprise updating the associated documents by the associating unit 3, to reflect the updated set of completed search terms. Moreover, the updating of the display may comprise updating the arrangement of the completed search terms by the arranging unit, to reflect the updated set of completed search terms and the associated documents.

As mentioned before, the property of the documents, used by the arranging unit 4 to arrange the completed search terms, may comprise a time, such as a creation time or modification time or last access time. The arranging unit 4 may be configured to sort the completed search terms based on the property of the documents. For example, the arranging unit 4 may arrange the one or more completed search terms on a timeline based on the time of the document associated with the completed search term. It is also possible that the completed search terms are sorted based on e.g. a file type of the associated documents.

The display unit 5 may be arranged for displaying a text label representing a completed search term. The text label may spell out the completed search term. Moreover, a symbol representing the associated document may be displayed. The text label and the symbol may be visually connected by placing them closely together or by connecting them via a line or arrow, or by color coding, for example. The symbols representing documents may be placed on a timeline, based on their time property.

Figure 3:
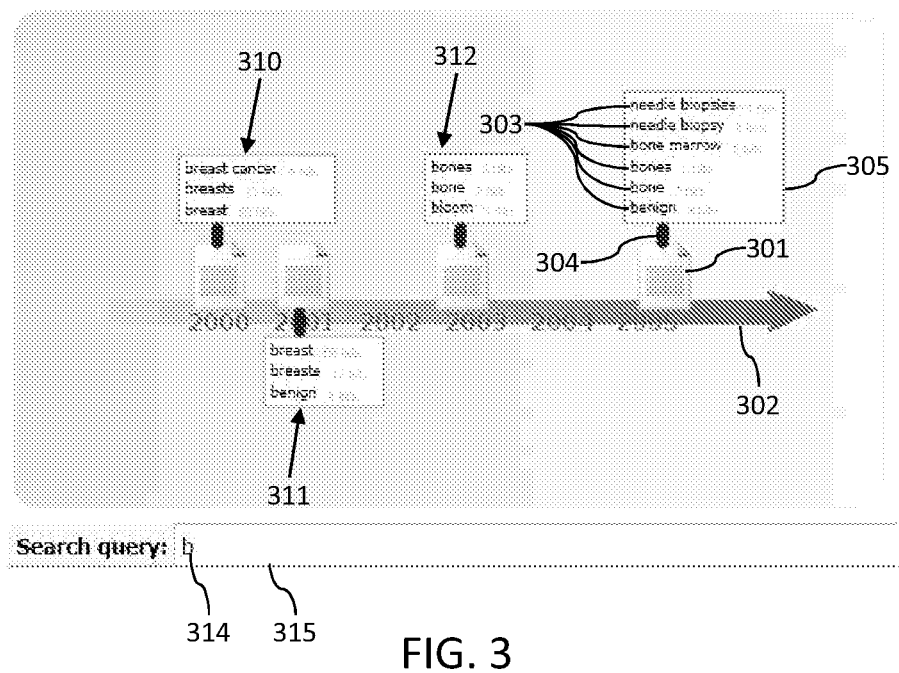
FIG. 3 shows an example application of a search bar with autocompletion in connection with a timeline.

An example snapshot of a screen displayed by the system is shown in FIG. 3. The symbol 301 represents a document. The symbols representing the documents have been arranged on a timeline 302. Moreover, the text labels 303 representing completed search terms associated with the document have been positioned in the vicinity of the symbol 301. Moreover, the association between the completed search terms and the associated document has been emphasized using a line 304 in between the symbol 301 and a box 305 comprising the text labels 303. The box 305 comprises the text labels 303 of a group of completed search terms. The completed search terms associated with other documents have been arranged in a similar fashion in FIG. 3, as shown at numerals 310, 311, 312. The user may edit the inputted search string 314 in the search box 315.

Returning to FIG. 1, the display unit 5 may be arranged for displaying a snippet of text extracted from the associated document, wherein the snippet of text comprises the completed search term.

The system may further comprise a selection unit 6 for enabling the user to select a completed search term from among the displayed completed search terms, to obtain a selected completed search term. For example, the user can select a completed search term by pointing a mouse cursor to the search term and clicking. Alternatively, the user can touch the search term when displayed on a touch screen. The selected completed search term can be used to trigger a more comprehensive search based on the selected completed search term, using a search engine 12. The results of the search engine 12 may then be presented as a set of documents arranged in a list or on a timeline, for example.

The system may further comprise a document viewer 7 for enabling a user to view the document associated with the selected completed search term. The document viewer 7 may be arranged for indicating the one or more occurrences of the autocompletion term in the viewed document. This may be performed by highlighting the occurrences of the selected completed search term in the viewed document. Alternatively or as an additional option, the user may select a symbol representing a document, upon which the document will be opened in the document viewer 7. In this case, the document viewer 7 may be arranged, for example, to indicate all occurrences of all associated completed search terms in the document. Alternatively, the document viewer 7 may be arranged to simply open the selected document for viewing without indicating any occurrences of the search terms.

The components of the system may be implemented at least partly in software installed on a computer system.

Figure 4:
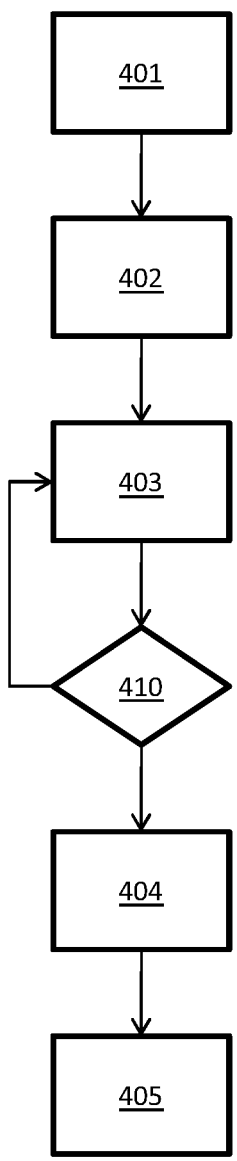
FIG. 4 shows a flowchart of a method of performing a search for a document in a collection of documents.

FIG. 4 shows a flowchart of a method of performing a search for a document. The method includes step 401 of enabling a user to indicate a part of a search term. In step 402, one or more completions of the user-indicated part of the search term are determined. This step results in one or more completed search terms. In step 403, a completed search term is associated with a document matching the completed search term. The document may have a property associated therewith. In step 410, it is determined whether the completed search term is to be associated with a further document matching the completed search term. If it is determined that the completed search term is to be associated with a further document matching the completed search term, step 403 is repeated for that further document. Moreover, in step 410, it is determined whether there are further completed search terms generated in step 402 with which no documents have been associated yet. If such a further completed search term is found, then step 403 is repeated to associate a document with the further search term. If in step 410 it is found that all completed search terms have been associated with sufficient documents, the flow proceeds to step 404. In step 404, the one or more completed search terms are arranged based on the property of the documents associated with the completed search terms, to obtain an arrangement of the completed search terms. In step 405, the one or more completed search terms are displayed according to the arrangement. The steps of the method may be implemented at least partly in software installed on a computer system.

A visual connection may be made between the autocompletion suggestions and the particular documents in which they appear. Multiple autocompletion boxes may be displayed, one for each document on the timeline, and the autocompletion box corresponding to a document only shows the suggestions that appear in that particular document. Optionally, and if the layout of the interface permits, instead of classical autocompletion suggestions the system could immediately show search results for each of the documents, in form of snippets of texts that match the search query.

The autocompletion unit may be arranged for more complex matching of completed search terms. For example, multiple parts of the input string can be matched simultaneously. For example, if one enters 'b c', the autocompletion unit may be configured to match it to 'Breast Cancer'. In this example, multiple space-separated parts of the search string are matched to distinct words of the completed search terms. Accordingly, it is not necessary that the search string is exactly found in a completed search term.

In a clinical setting, the search process is usually limited to a particular time period. In many cases, the more recent documents and events present in the patient file are more important than the older ones. Consequently, the arrangement of the suggested completed search terms by date and time of the associated documents helps to assess the relevance of the search terms.

The systems and methods described herein have a broad application scope: they can applied in many search engines.

It will be appreciated that the invention also applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a flash drive or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or to be used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for performing a search for a document in a collection of documents, comprising
   a user input device of a computer for enabling a user to indicate a part of a search term;
   an autocompletion unit, implemented via a processor of the computer, for determining two or more completions of the part of the search term, to obtain two or more completed search terms;
   an associating unit, implemented via the processor of the computer, for associating each completed search term of the two or more completed search terms with a document matching the completed search term, wherein the document has a property associated therewith;
   an arranging unit, implemented via the processor of the computer, for arranging each completed search term of the two or more completed search terms in a display, based on the property of the document associated with the completed search term, to obtain an arrangement of the two or more completed search terms; and
   a display device of the computer for displaying the arrangement of the two or more completed search terms, wherein the arranging unit displays a timeline on the display, the line including points, and each point representing a value of a property, and
   wherein the autocompletion unit displays at least two pictures of at least two documents near respective points on the timeline corresponding to respective properties of the documents, wherein each of the pictures represents a respective one of the documents, and the arranging unit displays at least two boxes, wherein the boxes include text identifying completed search terms of a group of completed search terms associated with the documents, wherein the boxes are positioned, respectively, at a predetermined distance from the respective displayed documents.

2. The system according to claim 1, wherein the arranging unit is configured to arrange the two or more completed search terms into groups, wherein each group comprises the completed search terms matching a particular document of the collection of documents.

3. The system according to claim 1, wherein the display unit is arranged for updating the display of the two or more completed search terms in response to the user input receiving an indication of an additional part of the search term.

4. The system according to claim 1, wherein the property of the documents comprises a creation time, a modification time or a last access time of the document.

5. The system according to claim 4, wherein the arranging unit is configured to arrange the two or more completed search terms on the timeline, based on one of the creation time, the modification time or the last access time of the document associated with the completed search term.

6. The system according to claim 1, wherein the part of the search term comprises a first string, a completed search term comprises a second string, and the first string is a substring of the second string.

7. The system according to claim 1, wherein the display unit is arranged for displaying a text label representing a completed search term in connection with a symbol representing the associated document.

8. The system according to claim 1, wherein the display unit is arranged for displaying a snippet of text extracted from the associated document, wherein the snippet of text comprises the search term.

9. The system according to claim 1, further comprising a selection unit for enabling the user to select a completed search term from among the displayed completed search terms, to obtain a selected completed search term.

10. The system according to claim 9, further comprising a search engine for searching documents matching the selected completed search term.

11. The system according to claim 9, further comprising a document viewer for enabling a user to view the document associated with the selected completed search term.

12. The system according to claim 11, wherein the document viewer is arranged for indicating the one or more occurrences of the autocompletion term in the viewed document.

13. A workstation comprising the system according to claim 1.

14. The system of claim 1, wherein the autocompletion unit obtains the two or more completed search terms by matching the input part of the search term to two or more search terms in an index of search terms.

15. The system of claim 1, wherein the autocompletion unit obtains the two or more completed search terms by searching the collection of documents for terms comprising the input part of the search term and using the terms as the two or more completed search terms.

16. A method of performing a search for a document, comprising
   enabling a user to indicate a part of a search term;
   determining two or more completions of the part of the search term, to obtain two or more completed search terms, by searching a collection of documents for terms comprising the input part of the search term and using the terms as the two or more completed search terms;
   associating each completed search term of the one or more completed search terms with a document matching the completed search term, wherein the document has a property associated therewith;

arranging each completed search term of the one or more completed search terms in a display, based on the property of the document associated with the completed search term, to obtain an arrangement of the one or more completed search terms; and displaying the arrangement of the one or more completed search terms, wherein the displaying includes displaying at least two pictures of at least two documents near respective points on a timeline corresponding to respective properties of the documents, wherein each of the pictures represents a respective one of the documents, and the arranging unit displays at least two boxes, wherein the boxes include text identifying completed search terms of a group of completed search terms associated with the documents, wherein the boxes are positioned, respectively, at a predetermined distance from the respective displayed documents.

17. A non-transitory computer readable medium storing a computer program comprising instructions for causing a processor system to perform the method according to claim 16.

18. An apparatus for performing a search for a document in a collection of documents, comprising a user input device of a computer that enables a user to indicate a part of a search term;

a processor configured to:

determine two or more completions of the part of the search term to obtain two or more completed search terms by matching the input part of the search term to two or more search terms in an index of search terms;

associate each completed search term of the two or more completed search terms with a document matching the completed search term, wherein the document has a property associated therewith;

arrange each completed search term of the two or more completed search terms in a display based on the property of the document associated with the completed search term to obtain an arrangement of the two or more completed search terms; and display the arrangement of the two or more completed search terms, wherein the displaying includes displaying at least two pictures of at least two documents near respective points on a timeline corresponding to respective properties of the documents, wherein each of the pictures represents a respective one of the documents, and the arranging unit displays at least two boxes, wherein the boxes include text identifying completed search terms of a group of completed search terms associated with the documents, wherein the boxes are positioned, respectively, at a predetermined distance from the respective displayed documents.

\* \* \* \* \*